US012609576B2

(12) United States Patent
Kim

(10) Patent No.: US 12,609,576 B2
(45) Date of Patent: Apr. 21, 2026

(54) MOTOR

(71) Applicant: LG INNOTEK CO., LTD., Seoul (KR)

(72) Inventor: Sang Tae Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 490 days.

(21) Appl. No.: 18/030,829

(22) PCT Filed: Oct. 12, 2021

(86) PCT No.: PCT/KR2021/013972
§ 371 (c)(1),
(2) Date: Apr. 7, 2023

(87) PCT Pub. No.: WO2022/080792
PCT Pub. Date: Apr. 21, 2022

(65) Prior Publication Data
US 2023/0378840 A1     Nov. 23, 2023

(30) Foreign Application Priority Data

Oct. 12, 2020     (KR) ........................ 10-2020-0131040

(51) Int. Cl.
*H02K 5/04* (2006.01)
*H02K 7/00* (2006.01)

(52) U.S. Cl.
CPC ............... *H02K 5/04* (2013.01); *H02K 7/003* (2013.01)

(58) Field of Classification Search
CPC .................................. H02K 5/04; H02K 7/003
See application file for complete search history.

(56) References Cited

U.S. PATENT DOCUMENTS 6,365,998 B1    4/2002  Kech et al.
2016/0025092 A1*  1/2016  Miyagawa .......... F04C 15/0088
                                          417/410.4

FOREIGN PATENT DOCUMENTS

JP        09-084303        3/1997
JP        3566781          9/2004
JP        2017-099147      6/2017
WO        WO 03-083311     10/2003

OTHER PUBLICATIONS

International Search Report dated Jan. 14, 2022 issued in Application No. PCT/KR2021/013972.

* cited by examiner

*Primary Examiner* — Terrance L Kenerly
(74) *Attorney, Agent, or Firm* — KED & ASSOCIATES

(57) ABSTRACT

The present invention can provide a motor including a first housing, a stator disposed in the first housing, a rotor disposed to correspond to the stator, a shaft coupled to the rotor, a second housing through which the shaft passes, and a pump gear disposed in the second housing, wherein the shaft includes a first region coupled to the pump gear, a second region coupled to the second housing, a third region coupled to the rotor, and a fourth region protruding from the rotor toward a bottom surface of the first housing, and an axial length of the fourth region is smaller than a minimum distance between a lower surface of the rotor and the bottom surface of the first housing.

10 Claims, 7 Drawing Sheets

[FIG. 1]
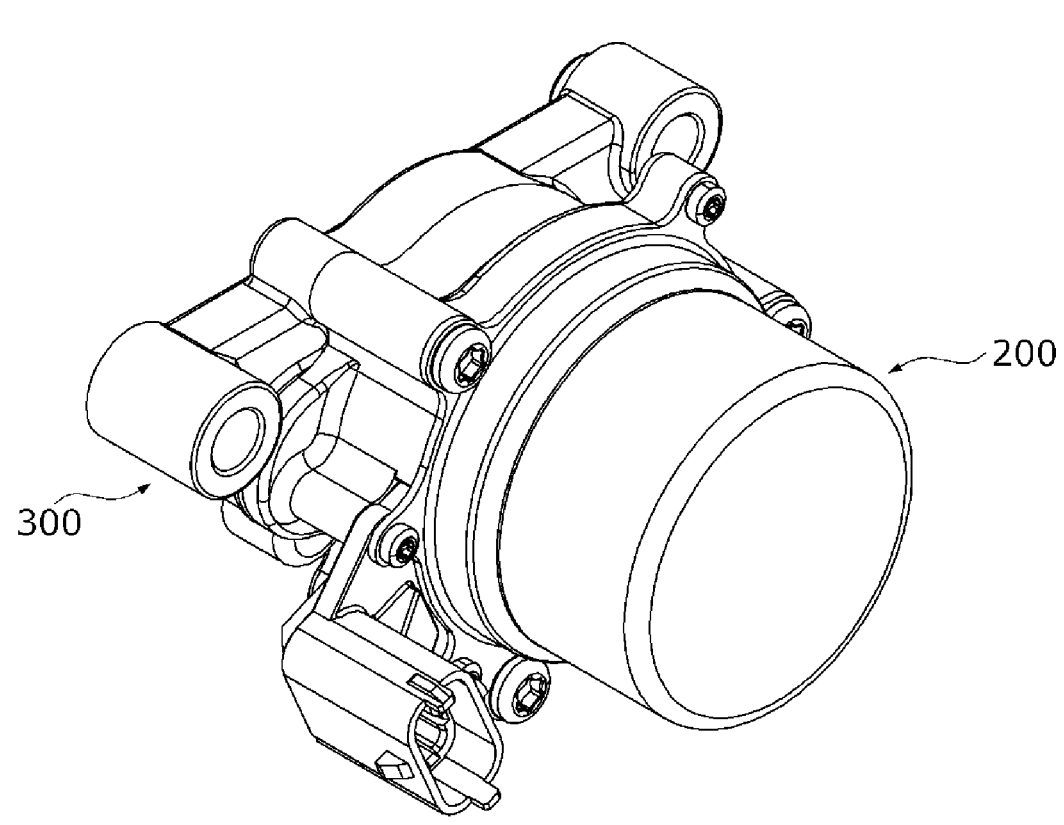

[FIG. 2]
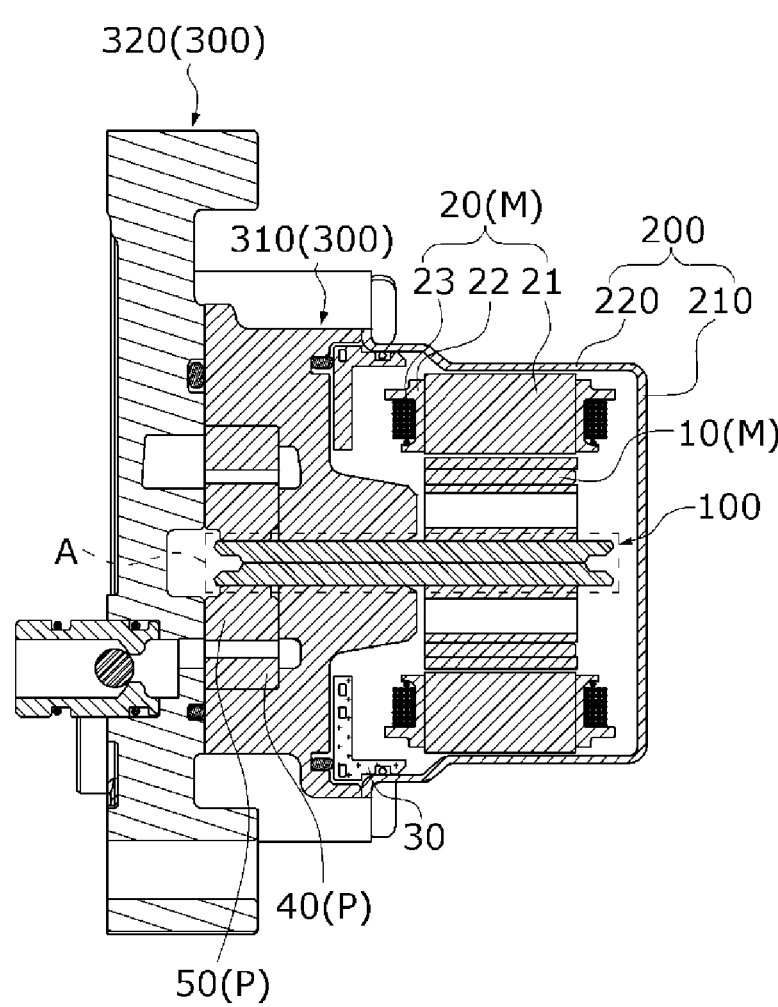

[FIG. 3]
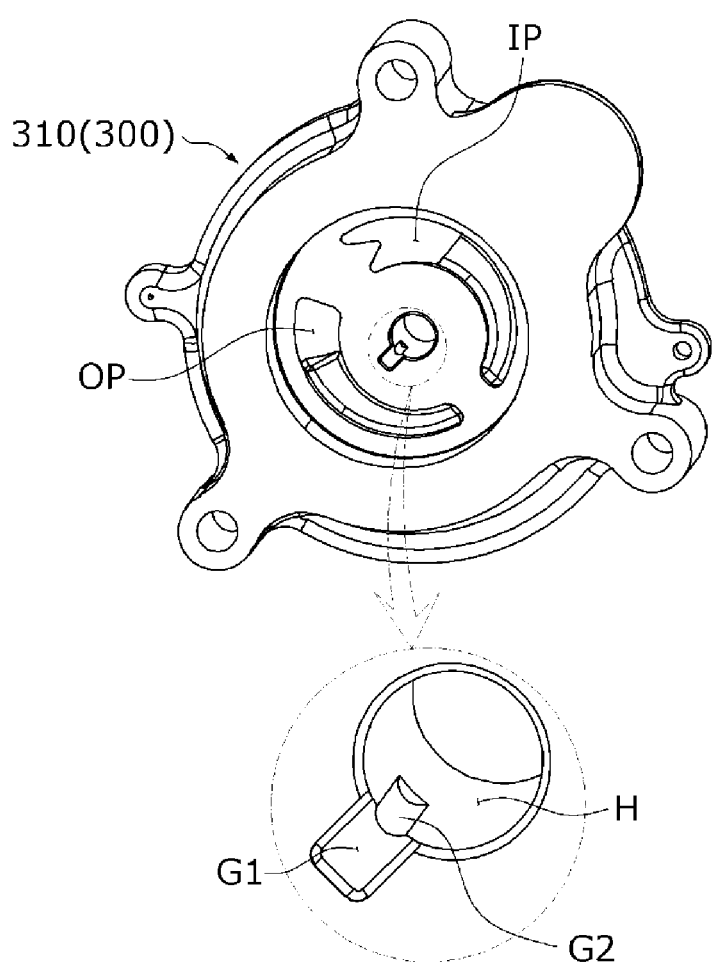

[FIG. 4]
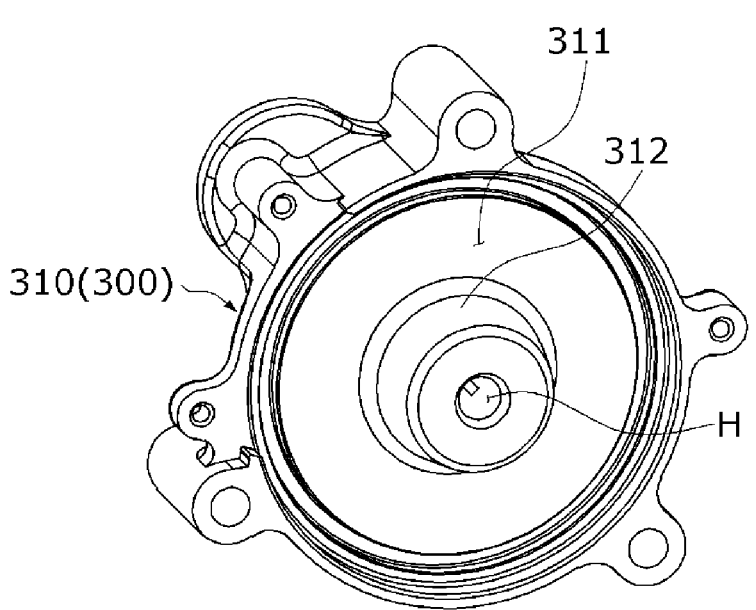

[FIG. 5]
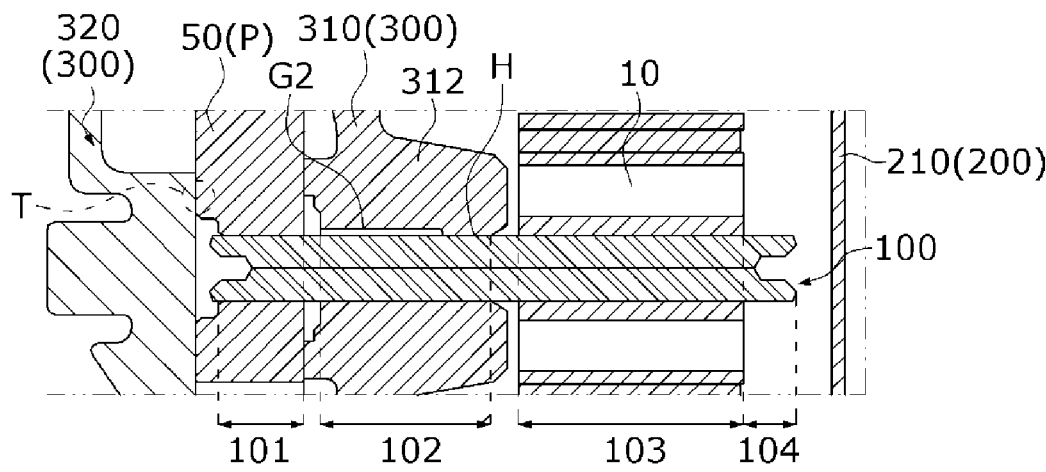

[FIG. 6]
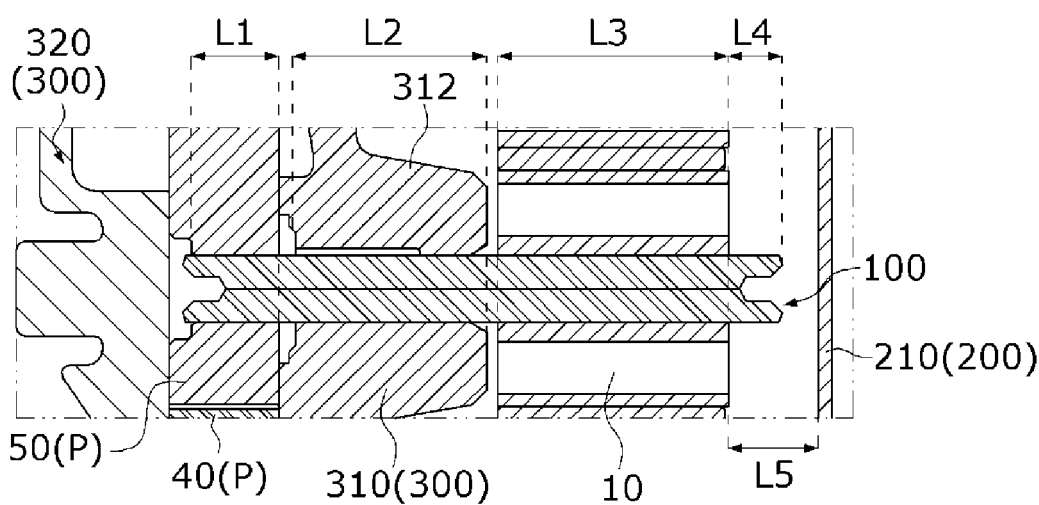

[FIG. 7]
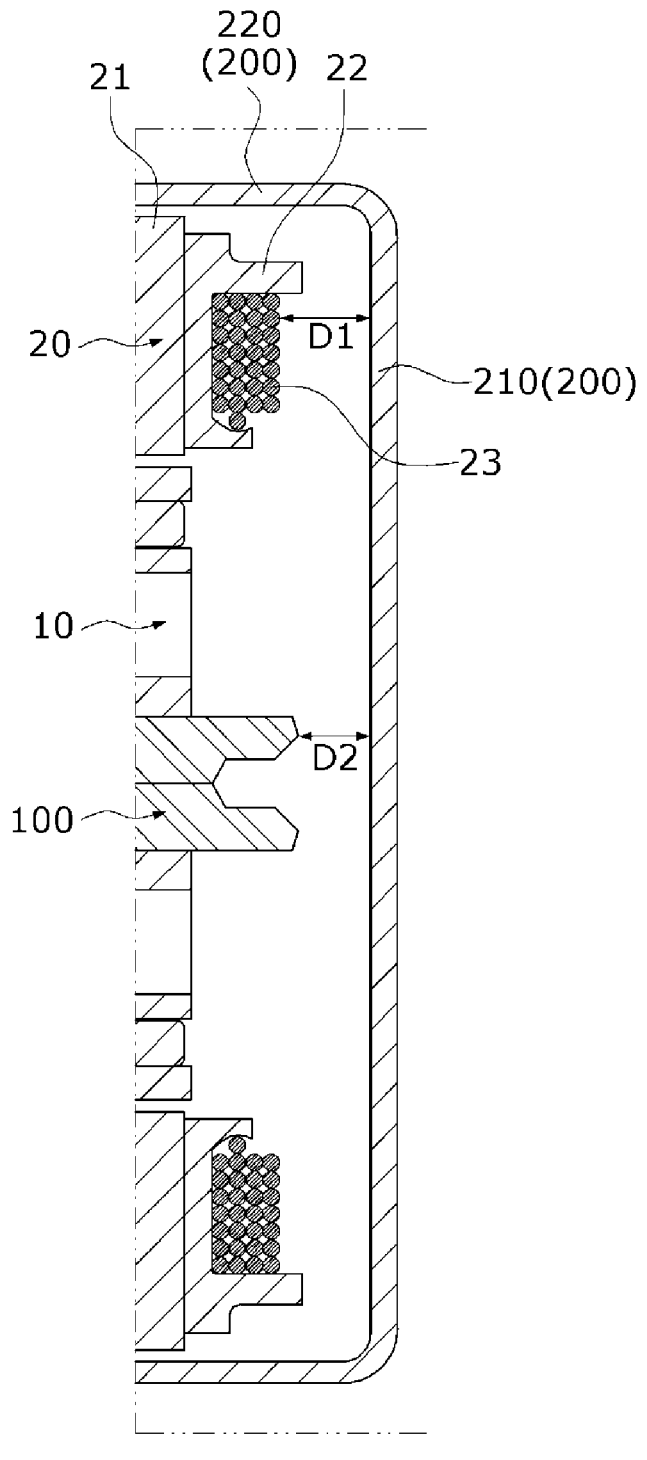

MOTOR

CROSS-REFERENCE TO RELATED PATENT APPLICATIONS

This application is a U.S. National Stage Application under 35 U.S.C. § 371 of PCT Application No. PCT/KR2021/013972, filed Oct. 12, 2021, which claims priority to Korean Patent Application No. 10-2020-0131040, filed Oct. 12, 2020, whose entire disclosures are hereby incorporated by reference.

TECHNICAL FIELD

The present invention relates to a motor.

BACKGROUND ART

Motors may be drive sources which supply oil to hydraulic lines in transmissions or braking systems which require oil circulation. Such a motor may include a motor part and a pump part. The motor part may include a shaft, a rotor, a stator, and a housing which accommodates the rotor and the stator therein. The pump part may include a second housing, an inner rotor connected to the shaft, and an outer rotor disposed in the second housing and engaged with the inner rotor. A suction port and a discharge port may be disposed in the second housing. When the rotor of the motor part rotates, a fluid (oil) is introduced through the suction port and then discharged through the discharge port.

Since the shaft should be disposed across the motor part and the pump part, bearings are required for axial supporting. On the basis of the rotor, the bearings may be disposed on one side and the other side of the rotor. Since the bearings should be supported by the housing and washers, there are problems that a structure of the housing is complicated, the number of components is increased, and an assembly process is complicated.

In addition, a failure of the bearings may cause a fatal problem when the motor is driven. In addition, due to an accumulated tolerance of the bearings and the structure for supporting the bearings, there is a problem of degrading the performance of the motor.

DISCLOSURE

Technical Problem

Accordingly, the present invention is intended to address the above problems and directed to providing a motor in which smooth rotation of a pump gear is implemented without a bearing.

Objectives to be achieved by the present invention are not limited to the above-described objective, and other objectives which are not described above will be clearly understood by those skilled in the art through the following descriptions.

Technical Solution

One aspect of the present invention provides a motor including a first housing, a stator disposed in the first housing, a rotor disposed to correspond to the stator, a shaft coupled to the rotor, a second housing through which the shaft passes, and a pump gear disposed in the second housing, wherein the shaft includes a first region coupled to the pump gear, a second region coupled to the second housing, a third region coupled to the rotor, and a fourth region protruding from the rotor toward a bottom surface of the first housing, and an axial length of the fourth region is smaller than a minimum distance between a lower surface of the rotor and the bottom surface of the first housing.

Another aspect of the present invention provides a motor including a first housing, a rotor disposed in the first housing, a shaft fixed to the rotor, a second housing which rotatably supports the shaft, and a pump gear fixed to the shaft, wherein the second housing includes a protrusion protruding toward the rotor, the protrusion includes a hole into which the shaft is rotatably inserted and a second groove which is connected to the hole and through which a lubricant is introduced, and a bearing is not disposed between a bottom surface of the first housing and the rotor.

Still another aspect of the present invention provides a motor including a first housing including a base and a sidewall extending from the base, a stator disposed in the first housing, a rotor disposed to correspond to the stator, a shaft coupled to the rotor, a second housing through which the shaft passes, and a pump gear disposed in the second housing, wherein the shaft includes a first region coupled to the pump gear, a second region coupled to the second housing, a third region coupled to the rotor, and a fourth region protruding from the rotor toward a bottom surface of the first housing, and the fourth region does not overlap the base in a direction perpendicular to an axial direction.

A ball bearing may not be disposed between the pump gear and the rotor.

A ratio of an axial length of a first region to an axial length of a second region may be in the range of 1:2.0 to 1:3.0.

A ratio of an axial length of a second region to an axial length of a third region may be in the range of 1:1.2 to 1:1.3.

The second housing and the shaft may be in contact with each other.

A lowermost end of a coil of the stator may be disposed closer to the bottom surface of the first housing than a lowermost end of the shaft is.

A lowermost end of a coil of the stator may be disposed closer to the base than a lowermost end of the shaft is.

The protrusion may overlap a part of the first housing in a direction perpendicular to the shaft.

Advantageous Effects

According to embodiments of the present invention, there is an advantage of implementing smooth rotation of a pump gear without a bearing.

There is an advantage of greatly reducing a cumulative tolerance by reducing the number of components for axial supporting.

There are advantages that a housing structure is simplified and the number of assembly processes is decreased.

By removing a bearing, there is an advantage of fundamentally removing a defect of a motor caused by a defect of the bearing.

DESCRIPTION OF DRAWINGS

FIG. 1 is a perspective view illustrating a motor according to one exemplary embodiment of the present invention.

FIG. 2 is a side cross-sectional view illustrating the motor illustrated in FIG. 1.

FIG. 3 is a view illustrating an outer surface of a first part of a second housing.

FIG. 4 is a view illustrating an inner surface of the first part of the second housing.

FIG. 5 is an enlarged view illustrating region A of FIG. 2.

FIG. 6 is an enlarged view which illustrates region A of FIG. 2 and shows lengths of a first region, a second region, a third region, and a fourth region of the shaft.

FIG. 7 is a cross-sectional view illustrating a bottom portion of a first housing.

MODES OF THE INVENTION

A direction parallel to a longitudinal direction (vertical direction) of a shaft is referred to as an axial direction, a direction perpendicular to the axial direction from the shaft is referred to as a radial direction, and a direction along a circle having a radius in the radial direction from a center, i.e., the shaft, is referred to as a circumferential direction.

FIG. 1 is a perspective view illustrating a motor according to one exemplary embodiment of the present invention, and FIG. 2 is a side cross-sectional view illustrating the motor illustrated in FIG. 1. FIGS. 1 and 2 are views clearly illustrating only main features for clear conceptual understanding of the present invention, and the scope of the present invention is not limited to specific shapes illustrated in the drawings, and as a result, various modifications should be expected. Hereinafter, the term "inward" refers to a direction from a housing 200 toward a shaft 100 which is a center of the motor, and the term "outward" refers to a direction opposite to "inward," that is, a direction from the shaft 100 toward the housing 200. In addition, hereinafter, a circumferential direction or radial direction is defined with respect to an axial center.

Referring to FIGS. 1 and 2 together, the motor according to one exemplary embodiment of the present invention may include the housing 200 and a second housing 300. The housing 200 may include a motor part M. The second housing 300 may include a pump part P. The second housing 300 may be coupled to the housing 200.

The motor part M is a part which transmits power to the pump part P and may include the shaft 100, a rotor 10, and a stator 20. The pump part P is a pump gear and includes an inner rotor 50 and an outer rotor 40.

The shaft 100 may be coupled to the rotor 10. The shaft 100 is disposed to extend from the motor part M to the pump part P. The shaft 100 may be rotatably disposed in the second housing 300. An end portion of the shaft 100 may be coupled to the inner rotor 50 of the pump part P. When a current is supplied, and an electromagnetic interaction occurs between the rotor 10 and the stator 20, the rotor 10 rotates, and the shaft 100 rotates in conjunction with the rotor 10. When the shaft 100 rotates, the pump part P operates while the inner rotor 50 rotates.

The rotor 10 rotates due to an electrical interaction with the stator 20. The rotor 10 may be disposed to correspond to the stator 20 and disposed inside the stator 20.

The stator 20 is disposed outside the rotor 10. The stator 20 may include a stator core 21, an insulator 22, and a coil 23. The insulator 22 is seated on the stator core 21. The coil 23 is mounted on the insulator 22. The coil 23 induces an electrical interaction with a magnet of the rotor 10.

A busbar 30 may be disposed at one side of the stator 20 and connected to the coil 23.

The housing 200 may be disposed outside the stator 20. The housing 200 may be a cylindrical member.

The pump part P serves to receive power from the motor part M and pump a fluid. The pump part P is a pump gear and may include the outer rotor 40 and the inner rotor 50. The outer rotor 40 is disposed outside the inner rotor 50. In addition, N outer lobes may be formed in the inner rotor 50 in a circumferential direction to face outward in a radial direction from an axial center. Meanwhile, N+1 inner lobes may be formed on the outer rotor 40 to face inward in a radial direction. In this case, the outer lobes may be formed to be caught by the inner lobes. As the inner rotor 50 rotates, the outer rotor 40 rotates at a rotation ratio of (N+1)/N. The pump part P has a predetermined eccentricity when the inner rotor 50 rotates. Due to such eccentricity, a space through which a fluid (oil) flows is formed between the inner rotor 50 and the outer rotor 40. That is, during a rotational movement of the inner rotor 50, a volume increase portion suctions a surrounding fluid due to a decrease in pressure, and a volume decrease portion discharges a fluid due to an increase in pressure.

The second housing 300 may be disposed to be divided into a first part 310 and a second part 320 which are coupled to each other. The first part 310 may be coupled to the housing 200, and the second part 320 may be coupled to an external device.

FIG. 3 is a view illustrating an outer surface of the first part of the second housing.

Referring to FIG. 3, a hole H is disposed in the first part 310 of the second housing 300. In addition, a suction port IP and a discharge port OP may be concavely disposed around the hole H in the first part 310 of the second housing 300. In addition, a first groove G1 and a second groove G2 may be disposed in the first part 310. The first groove G1 may be disposed to be connected to the hole H. The second groove G2 may be disposed inside the hole H to be connected to the first groove G1. The second groove G2 may be concavely disposed in an inner wall of the hole H. The first groove G1 and the second groove G2 guide a lubricant to smoothly flow through a gap between the shaft 100 and the hole H.

FIG. 4 is a view illustrating an inner surface of the first part of the second housing.

Referring to FIGS. 3 and 5, the first part 310 of the second housing 300 may include a body 311 and a protrusion 312. The protrusion 312 protrudes from one surface of the body 311 in an axial direction. In a state in which the second part 320 is coupled to the housing 200, the protrusion 312 protrudes toward the rotor 10 in the axial direction. The protrusion 312 may be a conical member having a truncated end. A part of the hole H may be disposed in the body 311, and the rest of the hole H may be disposed in the protrusion 312.

The protrusion 312 may be disposed to overlap the busbar 30 in a direction perpendicular to the axial direction. Alternatively, the protrusion 312 may be disposed to overlap a part of the insulator 22 in a direction perpendicular to the shaft 100. In addition, the protrusion 312 may be disposed to overlap a part of the first housing 200 in a direction perpendicular to the shaft 100.

The shaft 100 is rotatably supported by the second housing 300 without a separate bearing. Specifically, the shaft 100 is rotatably supported by the hole H.

Since a length of the hole H increases through the protrusion 312, the shaft 100 may be sufficiently supported without a separate bearing. The protrusion 312 may be disposed to be close to the rotor 10 in the axial direction to secure a sufficient length of the hole H. In particular, although the shaft 100 is disposed to extend from the motor part M to the pump part P, since the hole H is disposed between the motor part M and the pump part P in the axial direction, the shaft 100 can be stably supported without a bearing.

FIG. 5 is an enlarged view illustrating region A of FIG. 2.

Referring to FIG. 5, the shaft may sequentially include a first region 101, a second region 102, a third region 103, and a fourth region 104 in a longitudinal direction.

The first region 101 is a partial region of the shaft 100 coupled to the inner rotor 50. The second region 102 is a partial region of the shaft 100 coupled to the second housing 300. The third region 103 is a partial region of the shaft 100 coupled to the rotor 10. In addition, the fourth region 104 is a partial region of the shaft 100 protruding from the rotor 10 toward a bottom surface of the first housing 200.

One end of the shaft 100 is press-fitted into the inner rotor 50. The other end of the shaft 100 is press-fitted into the rotor 10. In addition, the shaft 100 is rotatably supported by the protrusion 312 of the second housing 300. Since the second groove G2 is provided in an inner surface of the hole H of the protrusion 312, and the lubricant is supplied to a gap between the shaft 100 and the hole H. The shaft 100 may smoothly rotate inside the hole H. Since two ends of the shaft 100 are fixed by the inner rotor 50 and the rotor 10 and rotatably supported by the protrusion 312, any bearing for supporting the shaft 100 may be removed not only between the inner rotor 50 and the rotor 10 but also between the end of the shaft 100 and the bottom surface of the first housing 200.

The gap between the shaft 100 and the hole H may have a size ranging from 0.01 mm to 0.05 mm. In the range of the gap, the shaft 100 can be supported, and smooth rotation can be maintained in the radial direction at the same time.

In addition, a gap T between the inner rotor 50 and the second part 320 of the second housing 300 in the axial direction may have a size ranging from 0.01 mm to 0.1 mm. In the range of the gap T, the shaft 100 can be supported, and smooth rotation can be maintained in the axial direction at the same time. In this case, since the inner rotor 50 serves to support an axial load, structural stability of the shaft 100 can be improved without a bearing.

FIG. 6 is an enlarged view which illustrates region A of FIG. 2 and shows lengths of the first region, the second region, the third region, and the fourth region of the shaft 100.

Referring to FIGS. 2, 5, and 6, a ratio of an axial length L1 of the first region 101 to an axial length L2 of the second region 102 may be in the range of 1:2.0 to 1:3.0. In addition, a ratio of the axial length L2 of the second region 102 to an axial length L3 of the third region 103 may be in the range of 1:1.2 to 1:1.3. In this condition, the shaft 100 can be supported, and smooth rotation can be maintained at the same time.

Meanwhile, an axial length LA of the fourth region 104 is smaller than a minimum distance L5 from a lower surface of the rotor 10 to the bottom surface of the first housing 200. This is a possible structure because the fourth region 104 is not in contact with other components and there is no bearing between the rotor 10 and the bottom surface of the first housing 200 in the axial direction.

FIG. 7 is a cross-sectional view illustrating a bottom portion of the first housing 200.

Referring to FIGS. 2 and 7, a lowermost end of the coil of the stator may be disposed closer to the bottom surface of the first housing 200 than a lowermost end of the shaft 100 is. When the first housing 200 is divided into a base 210 constituting the bottom surface and a sidewall 220 extending from the base 210, a minimum distance D1 between the lowermost end of the coil 23 of the stator 20 and the base 210 may be smaller than a minimum distance D2 between the lowermost end of the shaft 100 and the base 210. The base 210 may have a simple structure in a flat plate shape.

Accordingly, the fourth region 104 of the shaft 100 does not overlap the base 210 in the axial direction. This is a possible structure because there is no bearing between the rotor 10 and the base 210 in the axial direction. Since a bearing is omitted and the base 210 of the first housing 200 is simple in the flat plate shape, there are advantages that it is easy to manufacture the first housing 200, the number of processes is greatly reduced, and assembly is easy. Since a bearing and a pocket structure for accommodating a washer for supporting the bearing can be omitted in the first housing 200, there is an advantage that an axial length of the entire motor can also be reduced.

In the above embodiments, an example of an inner rotor type motor has been described, but the present invention is not limited thereto. The present invention can also be applied to an outer rotor type motor. In addition, in the above embodiments, an example of the motor in which the busbar 30 is disposed has been described, but the present invention can also be applied to a motor without a busbar 30. In addition, the present invention can be used in various devices such as vehicles or home appliances.

The invention claimed is:

1. A motor, comprising:
a first housing;
a rotor disposed in the first housing;
a shaft fixed to the rotor;
a second housing which rotatably supports the shaft; and
a pump gear fixed to the shaft, wherein the second housing includes:
a first part in which a suction port and a discharge port are formed, the first part including a first groove; and
a protrusion protruding toward the rotor, the protrusion including a hole into which the shaft is rotatably inserted and a second groove which is connected to the hole and through which a lubricant is introduced, wherein a bearing is not disposed between a bottom surface of the first housing and the rotor, and wherein the second groove is located inside of the hole and fluidly connected to the first groove.

2. The motor of claim 1, wherein the shaft includes a first region coupled to the pump gear, a second region coupled to the second housing, a third region coupled to the rotor, and a fourth region protruding from the rotor toward the bottom surface of the first housing, and wherein an axial length of the fourth region is smaller than a minimum distance between a lower surface of the rotor and the bottom surface of the first housing.

3. The motor of claim 1, wherein the first housing includes a base and a sidewall extending from the base, wherein the shaft includes a first region coupled to the pump gear, a second region coupled to the second housing, a third region coupled to the rotor, and a fourth region protruding from the rotor toward the bottom surface of the first housing, and wherein the fourth region does not project onto the base when viewed along an axial direction.

4. The motor of claim 1, wherein a bearing is not disposed between the pump gear and the rotor.

5. The motor of claim 3, wherein a ratio of an axial length of a first region measured along a shaft axis to an axial length of a second region measured along the shaft axis is in the range of 1:2.0 to 1:3.0.

6. The motor of claim 3, wherein a ratio of an axial length of a second region measured along a shaft axis to an axial length of a third region measured along the shaft axis is in the range of 1:1.2 to 1:1.3.

7. The motor of claim 1, wherein the second housing and the shaft are in contact with each other.

8. The motor of claim 1, wherein a lowermost end of a winding coil of the stator is disposed closer to the bottom surface of the first housing than a lowermost end of the shaft.

9. The motor of claim 3, wherein a lowermost end of a winding coil of the stator is disposed closer to the base than a lowermost end of the shaft.

10. The motor of claim 1, wherein the protrusion is positioned such that its projection along a direction perpendicular to the shaft overlaps a portion of the first housing.

* * * * *